United States Patent
Brown et al.

(10) Patent No.: US 8,510,290 B1
(45) Date of Patent: Aug. 13, 2013

(54) INDEX SELECTION IN A MULTI-SYSTEM DATABASE MANAGEMENT SYSTEM

(75) Inventors: Douglas Brown, Rancho Santa Fe, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 484 days.

(21) Appl. No.: 12/317,808

(22) Filed: Dec. 30, 2008

(51) Int. Cl.
*G06F 17/30* (2006.01)

(52) U.S. Cl.
USPC .... 707/711; 707/696; 707/741; 707/E17.053; 707/E17.005

(58) Field of Classification Search
USPC .......... 707/999.002, 696, 711, 741, E17.005, 707/E17.053
See application file for complete search history.

(56) References Cited

U.S. PATENT DOCUMENTS

| | | | | |
|---|---|---|---|---|
| 5,913,207 | A * | 6/1999 | Chaudhuri et al. | 1/1 |
| 7,499,907 | B2 | 3/2009 | Brown | |
| 7,657,508 | B2 | 2/2010 | Morris | |
| 7,702,676 | B2 | 4/2010 | Brown | |
| 2003/0088579 | A1 * | 5/2003 | Brown et al. | 707/104.1 |
| 2005/0086263 | A1 * | 4/2005 | Ngai et al. | 707/104.1 |
| 2006/0085484 | A1 * | 4/2006 | Raizman et al. | 707/200 |
| 2007/0061375 | A1 | 3/2007 | Brown | |
| 2007/0094308 | A1 * | 4/2007 | Mitchell et al. | 707/201 |
| 2008/0097995 | A1 * | 4/2008 | Dias et al. | 707/8 |
| 2008/0162583 | A1 | 7/2008 | Brown | |
| 2009/0049024 | A1 | 2/2009 | Brown | |
| 2009/0132471 | A1 | 5/2009 | Brown | |
| 2009/0132602 | A1 | 5/2009 | Brown | |

OTHER PUBLICATIONS

Milynarczyk et al., Teradata Magazine Online, www.teradata.com, Power 2—Teradata Dual Active Solution Ensures a Smooth Ride, Sep. 2008 (4 pages).

Thomas P. Julien et al., U.S. Appl. No. 12/967,094, filed Dec. 14, 2010 entitled Providing Temporary Indexes for Different Workloads (34 pages).

* cited by examiner

*Primary Examiner* — Mahesh Dwivedi
*Assistant Examiner* — Shiow-Jy Fan
(74) *Attorney, Agent, or Firm* — Trop, Pruner & Hu, P.C.; Ramin Mahboubian

(57) ABSTRACT

A system includes a multi-system database management system having a plurality of database systems. An index selection subsystem combines sets of query information from respective ones of the plurality of database systems into a workload. The index selection subsystem then generates candidate indexes from the workload, and selects recommended indexes from the candidate indexes based on one or more criteria.

23 Claims, 2 Drawing Sheets

INDEX SELECTION IN A MULTI-SYSTEM DATABASE MANAGEMENT SYSTEM

BACKGROUND

A database is a collection of stored data that is logically related and that is accessible by one or more users. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in an RDBMS, queries according to a standard database-query language (e.g., Structured Query Language or SQL) are used. Examples of SQL include INSERT, SELECT, UPDATE, and DELETE.

As applications become increasingly sophisticated, and data storage needs become greater, higher performance database systems are used. One example of such a database system is the TERADATA® database management system from Teradata Corporation. The TERADATA® database system can be a parallel processing system capable of handling relatively large amounts of data. In some arrangements, a database system includes multiple nodes that manage access to multiple portions of data to enhance concurrent processing of data access and updates. Concurrent data processing is further enhanced by the use of virtual processors, sometimes referred to as access module processors (AMPs), to further divide database tasks. Each AMP is responsible for a logical disk space. In response to a query, one or more of the AMPs are invoked to perform database access, updates, and other manipulations.

A physical storage structure that is provided by some database management systems is an index. An index is a structure that provides relatively rapid access to the rows of a table based on the values of one or more columns. An index stores data values and pointers to the rows where those data values occur. An index can be arranged in ascending or descending order, so that the database management system can quickly search the index to find a particular value. The database management system can then follow the pointer to locate the row containing the value.

The advantage of having an index is that it speeds the execution of SQL statements with search conditions that refer to an indexed column or columns. Generally, it is desired to create an index for columns that are used frequently in search conditions (such as in the Where clause of a SELECT statement).

In a database management system, primary and secondary indexes can be defined for each table. In a database system having multiple access modules, such as AMPs in a TERADATA® database management system, the primary index is used for assigning a data row to a particular one of plural AMPs. In effect, the primary index determines the distribution of rows of a table across multiple AMPs of the database system. Secondary indexes are used by a database system to more quickly identify portions of tables that are to be accessed in response to a database query.

Proper selection of indexes (such as the primary and secondary indexes) is important for optimal database performance. This is also referred to as the index selection problem, which can be a difficult problem when applied to a sophisticated parallel database system. Conventionally, many database designers rely mostly on their application experience and intuition to manually make index design decisions. With the increasing complexity of some database applications (e.g., data warehousing applications, which contain thousands of tables, indexes, and complex queries), the ability of a database designer to effectively perform tuning of indexes becomes increasingly difficult.

The problem of selecting indexes is made even more complex in the context of a multi-system database management system that has multiple database systems. For example, due to the size and nature of multi-system database machines, the search space of candidate indexes becomes very large such that the computations associated with traditional search algorithms used by conventional index selection tools are prohibitively expensive.

SUMMARY

In general, according to an embodiment, an index selection subsystem performs index selection for a multi-system database management system having a plurality of database systems. The index selection subsystem merges and sorts sets of query information from respective database systems into a workload, and generates candidate indexes from the workload. The index selection subsystem selects a recommended index from the candidate indexes based on one or more criteria.

Other or alternative features will become apparent from the following description, from the drawings, and from the claims.

DETAILED DESCRIPTION

Figure 1:
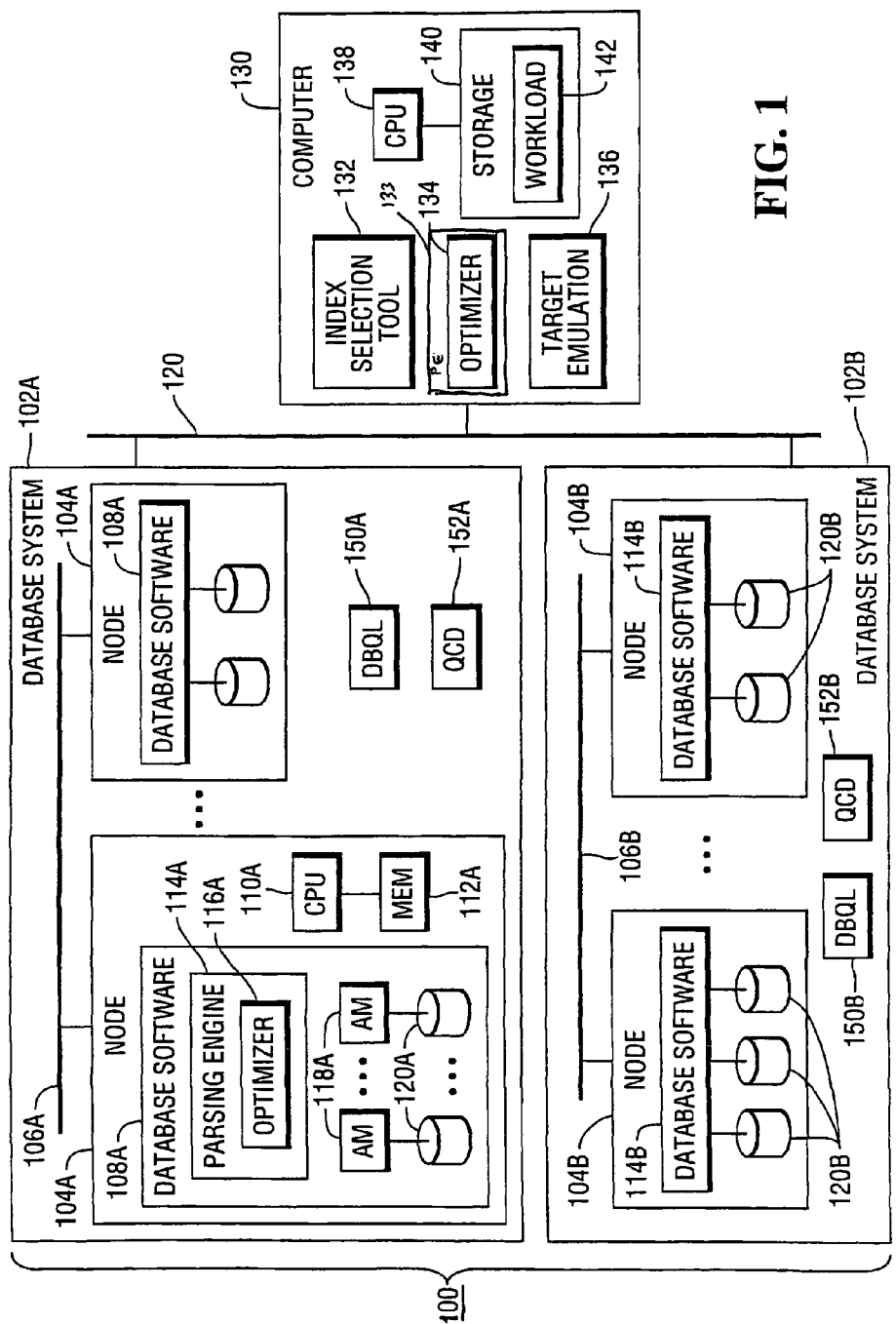
FIG. 1 is a block diagram of an exemplary multi-system database management system that includes a plurality of database systems, in which an embodiment of the invention is incorporated.

In accordance with some embodiments, index selection is performed by an index selection subsystem for a multi-system database management system that has multiple database systems. Here, a "database system" refers to a set of coordinated database nodes (or just a single node) and associated database software that perform database-related tasks in the database system. Each database system of a multi-system database management system can have a corresponding different configuration, such as number of database nodes, number of logical components such as access modules and parsing engines (described further below), database software version, data distribution scheme (based on hashing of a primary index, for example), and/or indexing scheme.

The multiple database systems of the multi-system database management system can be distributed over a wide geographic region. For example, the multi-system database management system can include a first database system located in a first city, a second database system located in a second city, and so forth. The multiple database systems of the multi-system database management system can provide redundancy by provided replications of data in one or more of the database systems. If one of the database systems were to go down, then the multi-system database management system can continue to operate (process received database queries) with the remaining functional database system(s). Also, as another example, one database system can be upgraded (e.g., database software upgrade) or maintained (e.g., to repair or replace components) while the remainder of the multi-system database management system can continue to operate.

The multiple database systems of the multi-system database management system provide flexibility in that each of the database systems can operate independently of other database systems when desired. Moreover, a database query submitted to the multi-system database management system can also be submitted to multiple ones of the database systems for processing to provide concurrency.

The index selection subsystem according to some embodiments is able to merge and sort multiple sets of query information corresponding to the multiple database systems of the multi-system database management system into one or more workloads. "Query information" can include the query statement, query plan, explain text, XML (Extensible Markup Language) version, and various statistics, such as CPU utilization, disk utilization, row count, average row size, block size, column statistics, table selectivity, row cardinality, spool usage, and so forth.

The index selection subsystem then can select candidate indexes based on each workload that contains merged and sorted sets of queries from the multiple database systems. Then, applying one or more criteria, the index selection subsystem is able to select a recommended index for a given table for a given system or set of multi-node systems. Note that a "recommended index" can include addition of an index or removal of an index. Note that the recommended index for the given table can be different for different database systems. For example, for a first database system, the index selection subsystem can select a first recommended index for the given table, while for a second database system, the index selection subsystem can select a second recommended index for a replica of the given table.

FIG. 1 illustrates an exemplary arrangement that includes a multi-system database management system 100 having multiple distinct database systems 102A and 102B. The database system 102A includes multiple database nodes 104A, which are interconnected by an interconnect network 106A. Each database node 104A can include a server computer and associated storage devices.

As depicted in FIG. 1, each database node 104A includes database software 108A that is executable on one or more central processing units (CPUs) 110A of the node 104A. The CPU(s) 110A is (are) connected to memory 112A. The database software 108A includes a parsing engine 114A, which receives database queries and parses such received database queries. The parsing engine 114A includes an optimizer 116A that generates query plans in response to a database query, where the optimizer 116A selects the most efficient query plan from among multiple query plans. The query plan includes a number of steps for the query.

The parsing engine 114A can send the steps of the query plan to one or more of multiple access modules 118A, which are also part of the database software 108A. Each access module 118A is responsive to the steps received from the parsing engine 114A to perform one or more of the following tasks: inserts, deletes, or modifies content of tables; creates, modifies, or deletes definitions of tables; retrieves information from definitions and tables; and locks databases and tables. In one example, each access module 118A can be based on an access module processor (AMP) used in some TERADATA® database systems from Teradata Corporation.

Each access module 118A manages access of data in respective storage modules 120A. A storage module 120A can be implemented with a physical storage device or with a logical storage device (e.g., a logical volume within one or more physical storage devices). The presence of multiple storage modules 120A allows a table to be distributed across the storage modules, where the content of the distributed table can be accessed concurrently by the access modules 118A.

The database system 102B similarly includes multiple database nodes 104B interconnected by an interconnect network 106B. Each database node 104B includes database software 114B connected to respective storage modules 120B. The database nodes 104B can be arranged similarly as the database nodes 104A, or alternatively, the database nodes 104B can be different from the database nodes 104A. Although not shown specifically, each of the database nodes 104A and 104B includes corresponding one or more CPUs.

As noted above, the configurations of the multiple database systems (e.g., 102A, 102B) of a multi-system database management system can be different. For example, the database system 102A can have a first configuration (number of database nodes 104A, number of access modules 118A in each database node, number of parsing engines 114A, database software version, indexing scheme, data distribution scheme, etc.), while the database system 102B can have a second configuration (number of database nodes 104B, number of access modules 118B, number of parsing engines 114B, database software version, indexing scheme, data distribution scheme, etc.).

To provide coordination between the database systems 102A and 102B, the database systems 102A and 102B are connected by a network 120 (e.g., a wide area network to connect geographically dispersed database systems). In some cases, the database systems 102A and 102B can run independently of each other. In other cases, however, there may be some coordination among the database systems of the multi-system database management system 100 such that processing of a query may involve tasks being performed by two or more of the database systems.

Although just two database systems 102A and 102B are depicted in FIG. 1, it is noted that the multi-system database management system 100 can include more than two database systems. Moreover, even though each of the database systems 102A, 102B is depicted as having multiple database nodes, it is noted that in different embodiments, one or more of the database systems can include just one database node.

To provide redundancy, multiple copies of a particular table (e.g., table A) can be kept in the distinct database systems. For example, the database system 102A can store a first copy of table A, while the database system 102B stores a second copy of table A.

Due to different configurations of the database systems 102A and 102B, it may be desirable to use different indexes for the two different database systems 102A, 102B. Thus, in accordance with some embodiments, an index selection subsystem can potentially select different indexes to use for different copies of the same table maintained in different database systems.

FIG. 1 depicts an index selection subsystem implemented in a computer 130 that is separate from the database systems 102A, 102B. In an alternative implementation, note that the index selection subsystem can be implemented in one or more of the database systems in the multi-system database management system. The computer 130 is connected to the network 120 to communicate with the database systems of the multi-system database management system 100. The computer 130 includes an index selection tool 132, a parsing engine 133 that includes an optimizer 134, and a target emulation tool 136 to emulate environments of the database systems in the multi-system database management system 100. The computer 130 can include multiple parsing engines 133 and multiple index selection tools 132. The index selection tool(s) 132, optimizer(s) 134, and target emulation tool 136 can be software tools executable on one or more CPUs 138 in the computer 130. The CPU(s) 138 is (are) connected to a storage 140. A workload 142 (or workloads) is (are) stored in the storage 140, where the workload(s) 142 can include merged and sorted query information from the multiple database systems of the multi-system database management system 100. It is noted that the computer 130 can be implemented with multiple computing nodes, such as a massively parallel system of computing nodes.

In other embodiments, the components 132, 134, and 136 can actually be implemented with a farm of parsing engines in a database node (e.g., one of nodes 104). Note that each of the parsing engines includes a corresponding optimizer. The database node can be enabled to perform emulation of various database systems that are the target of index selection.

In some embodiments, the architecture of the computer 130 can be referred to as a "virtual regulator" architecture. The virtual regulator architecture allows multiple threads of the index selection tool 132 to be spawned to run in parallel thus increasing the performance of the index selection problem. Hundreds or thousands of parsing engines (with associated optimizers 134) can be configured to perform searching in parallel to avoid time delays.

In the ensuing discussion, reference is made to a workload (in the singular sense) that contains merged and sorted query information from multiple database systems. However, it is noted that embodiments are applicable to scenarios where there are multiple workloads that each contains merged and sorted query information from multiple database systems. Also, although reference is made to the index selection tool 132 and optimizer 134 in the singular, note that the tasks performed can actually be performed by multiple threads (up to hundreds, thousands or more) of the index selection tool 132 and the optimizer 134.

The index selection tool 132 automates the index selection process by recommending a set of indexes for a particular workload 142, which corresponds to sets of query information that are captured from the multiple database systems 102A, 102B and merged and sorted into one workload. Note that considering multiple sets of query information from different database systems as a workload is different from index selection processes conventionally performed, which typically consider just the workload from a single database system. Also, the index selection can be performed in parallel on multiple processors or database nodes, and/or in emulation mode (where a database system is emulated without real data).

In accordance with some embodiments, each workload captured from a database system can be a workload defined for other purposes. During normal operation, the database system can define a "workload" as a set of requests that have common characteristics, such as an application that issued the requests, a source of the requests, type of query, priority, response time goals, throughput, and so forth. A workload is defined by a workload definition, which defines characteristics of the workload as well as various rules associated with the workload. Each workload 142 used by the index selection tool 132 according to some embodiments can be based on a combining corresponding workloads normally defined by the database systems 102A, 102B. These workloads can be logged in corresponding logs of the database systems, such as database query logs (DBQLs) 150A, 150B in corresponding database systems 102A, 102B. A given workload 142 to be used by the index selection tool 132 can share the same workload identifier as the corresponding workloads logged in the database systems 102A, 102B.

Based on the workload 142, the index selection tool 132, in cooperation with the optimizer 134, recommends a set of indexes that are appropriate for the given workload. The indexes recommended can be primary indexes or secondary indexes. The term "index" or "indexes" is intended to cover any index that can used to enhance table access in a database system, including, as examples, a unique secondary index (USI), a non-unique secondary index (NUSI), a primary index (PI), covered index, and so forth.

A primary index determines distribution of data across multiple database nodes of a database system. For example, hashing can be applied on the primary index of any given table row to produce a hash value to indicate which database node the given table row is to be stored. Primary indexes include PPI (partitioned primary index), multi-level PPI, and JI (join index).

Other types of indexes, including USIs, NUSIs, and hashed indexes (which are different types of secondary indexes), are data structures in which column values (from a table) are sorted (e.g., in ascending or descending order) and associated with row pointers. To access data in the table, the corresponding index can be consulted to quickly find the rows containing the data.

As depicted in FIG. 1, each database system 102A or 102B can log activity (in the form of workloads, for example) in the respective database system. The logged activity includes logged queries that can be stored in a database query log (DBQL) 150A (in database system 102A) or DBQL 150B (in database system 102B). The logged workload can be stored with a respective workload identifier, which allows the index selection tool 132 to analyze queries in a particular workload from among different types of workloads (such as strategic workloads versus tactical workloads). In addition to storing the query, the DBQL 150A or 150B can also store information associated with the queries, such as account identifier, user identifier, client identifier, usage of objects, rows returned, start and finish times, and so forth. The DBQL 150A or 150B can include various DBQL tables, including a table to store the SQL statement of a query, a table to store query objects, a table to store query step information, a table to store explain information, data in XML form, and so forth.

Alternatively, instead of storing database activity in the DBQL 150A or 150B, the database system 102A or 102B can store queries in a query capture database (QCD) 152A or 152B, respectively. The QCD 152A or 152B is also made up of several tables, which can store captured query plans and other information including data in XML format (to allow quick access by special parsers, for example).

The index selection tool 132 in the computer 130 is able to retrieve workload information from corresponding database systems 102A, 102B, such as by accessing (combining workloads from) the DBQLs 150A, 150B, or the QCDs 152A, 152B. Workloads in the DBQLs or QCDs can be accessed by workload identifier, for example. The captured query information from the multiple database systems 102A, 102B are merged and sorted by the index selection tool 132 into the workload 142. As further discussed below, emulation data of the multiple database systems are also retrieved such that index selection can be performed in the emulated environments of the database systems 102A, 102B.

Although just one workload 142 is depicted in FIG. 1, it is noted that the index selection tool 132 can retrieve multiple workloads corresponding to different tables, for example. The computer 130 can also maintain a global view (global dictionary) of all data dictionaries in the domain that includes the database systems 102A, 102B. The index selection tool 132 can use the global dictionary to generate views of the multi-system schemas. Having the schemas allow the computer 130 to emulate the customer's environment.

In accordance with some embodiments, the index selection tool 132 along with the optimizer 134 can be considered part of an index selection subsystem. Alternatively, the optimizer 134 can be part of the index selection tool 132. The optimizer 134 is executed in an emulated environment that is produced by the target emulation tool 136. The index selection tool 132 provides candidate indexes and statistics to the optimizer 134, which can generate an index recommendation based on cost analysis.

To perform target emulation, the target emulation tool 136 is able to export target emulation data from each of the database systems 102A, 102B. The target emulation data includes environment information, such as cost-related information, statistics, random samples, DDL (data definition language) statements, DML (data manipulation language) statements, actual database data, and so forth, from the database systems 102A, 102B. The environment information that is exported from the database systems and imported into the computer 130 allows the computer 130 to emulate the environments of the database systems 102A, 102B of the multi-system database management system 100.

Figure 2:
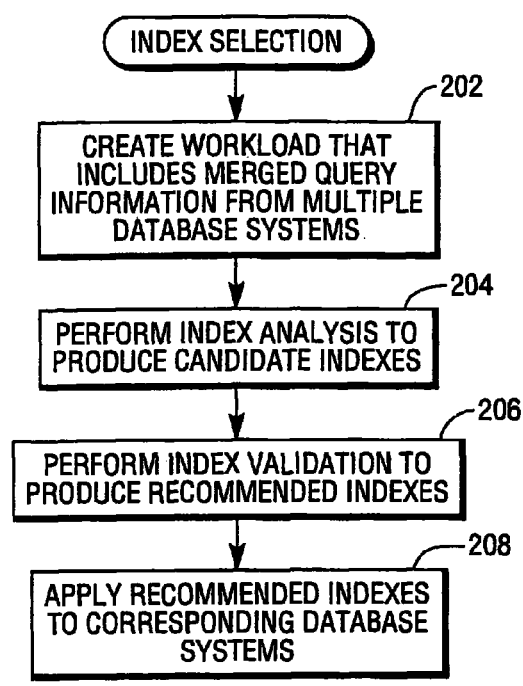
FIG. 2 is a flow diagram of a process of performing index selection for a multi-system database management system, according to an embodiment.

FIG. 2 is a flow diagram of a process performed by an index selection subsystem (e.g., including index selection tool 132 and optimizer 134 in FIG. 1) according to an embodiment. The index selection subsystem creates (at 202) a workload, which is based on combining sets of query information from corresponding database systems 102A, 102B. For example, the index selection subsystem can access the DBQLs 150A, 150B from the database systems 102A, 102B to retrieve the desired information. Alternatively, the index selection subsystem can retrieve the information from the QCDs 152A, 152B. The multiple sets of query information from the database systems 102A, 102B are combined into the workload 142 (FIG. 1).

The reason to combine query information from multiple database systems 102A, 102B into one workload 142 is to enable the index selection subsystem to determine whether any given database query touches more than one database system. This may affect which indexes are selected.

Query information can be captured in each of the database systems 102A, 102B using one of various possible techniques. For example, to capture query information into the QCDs 152A, 152B in the database systems 102A, 102B, an SQL (Structured Query Language) INSERT EXPLAIN statement can be used. Such a statement would cause query plans, along with various associated information (e.g., CPU utilization, disk utilization, row count, average row size, column statistics, etc.) to be stored into the QCDs or DBQLs.

The index selection subsystem next performs (at 204) index analysis on the workload, from which a set of candidate indexes are selected. In the index analysis, the index selection tool 132 creates a list of potential indexes. Then, the index selection tool 132 simulates the performance of the workload 142 in the emulated environment (generated from target emulation data imported by the target emulation tool 136) as if various combinations of the potential indexes. Based on the simulated performance, the index selection tool 132 produces the set of candidate indexes. The index selection subsystem will consider alternative different indexes for different copies of a particular table maintained in the distinct database systems 102A, 102B. Also, the index selection tool 132 can set the optimizer 134 to run in simulation mode. In fact, there can be a large number of optimizer (or parsing engine) simulations being performed in parallel at a given time.

The index analysis performed at 204 can be done with multiple threads of the index selection tool 132 and optimizer 134 spawned to run in parallel to improve speed and performance of the index selection problem.

Next, the index selection subsystem performs (at 206) index validation, in which another simulation is performed to ensure that the optimizer 134 will in fact pick the correct indexes if they are present. The simulation is performed to cover the entire multi-system database management system. Performance of the index validation results in selection of recommended indexes from the set of candidate indexes. In index validation, the optimizer 134 can produce query plans with and without different candidate indexes. The costs of query plans with and without the candidate indexes are compared, and the best performing candidate indexes (those candidate indexes that results in the most cost savings) are selected as the recommended indexes. Note that an index recommendation can involve recommending the addition of an index or the removal of an index.

The index validation performed at 206 can also be performed with multiple threads of the index selection tool 132 and optimizer 134.

The candidate indexes that are not selected can be deleted. Note that different recommended indexes can be selected for any given table for the different database systems. For example, different copies of the base tables can be instantiated with different primary indexes in the different database systems. Also, different secondary indexes can be associated with different copies of the base tables in the different database systems.

The recommended indexes are then applied (at 208) to the corresponding database systems 102A, 102B. When applying a recommended index to a database system 102A or 102B, a SQL CREATE INDEX statement can be employed. It is possible that a Quality of Service option can be included in the CREATE INDEX statement that would steer storage of the index in a storage device of appropriate performance (e.g., storage in high-speed memory versus disk).

The various tasks discussed above can be performed by software, such as the index selection tool 132, optimizer 134, target emulation tool 136, database software 114A or 114B, and so forth. Instructions of such software are loaded for execution on a processor (such as CPUs 110A and 138 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A system, comprising:
a multi-system database management system that includes a plurality of database systems with different configurations from each other, wherein each of the different configurations specifies the following: a number of database nodes and a number of access modules in each database node, a number of parsing engines, and a version of database software, and wherein each of the database systems can process data independently by using one or more processors; and
an index selection subsystem that includes one or more processors operable to:
combine sets of query information from each one of the plurality of database systems into a workload;
generate, from the workload, one or more candidate indexes for each one of the plurality of the database systems; and
select one or more recommended indexes from the candidate indexes for each one of the plurality of database systems at least partly based on the number of database nodes and the number of access modules in each database node, the number of parsing engines, and the version of database software of the configuration of each one of the plurality of database systems.

2. The system of claim 1, wherein selecting recommended indexes includes adding an index or removing an index.

3. The system of claim 1, wherein the selected recommended indexes are replicated across the plurality of database systems.

4. The system of claim 1, wherein the recommended indexes comprise a first recommended index for a first of the plurality of database systems, and a second recommended index for a second of the plurality of database systems.

5. The system of claim 4, wherein the first recommended index is for a first copy of a given table in the first database system, and the second recommended index is for a second copy of the given table in the second database system.

6. The system of claim 5, wherein the first and second recommended indexes are selected from among primary indexes, partitioned primary indexes, join indexes, and multi-level partitioned primary indexes.

7. The system of claim 5, wherein the first and second recommended indexes are secondary indexes.

8. The system of claim 1, wherein the index selection subsystem includes multiple threads of an index selection tool that run in parallel.

9. The system of claim 8, wherein the index selection subsystem further includes multiple threads of a parsing engine that run in parallel.

10. The system of claim 1, wherein at least two of the plurality of database systems of the multi-system database management system are geographically dispersed in different cities.

11. The system of claim 1, wherein the index selection subsystem includes one or more optimizers, and wherein the selected indexes are based on a cost analysis performed by the one or more optimizers.

12. The system of claim 11, wherein the cost analysis performed by the one or more optimizers is performed in an emulated environment that emulates the plurality of database systems in the multi-system database management system.

13. The system of claim 12, further comprising a target emulation tool retrieve target emulation data from the database systems to create the emulated environment.

14. The system of claim 1, further comprising a global dictionary that contains information relating to schemas used in the plurality of database systems.

15. A method executed by a computer for use with a multi-system database management system that includes a plurality of database systems with different configurations from each other, wherein each of the different configurations specifies: a number of database nodes and a number of access modules in each database node, a number of parsing engines, and a version of database software, and wherein each of the database systems can process data independently by using one or more processors, the method comprising:
retrieving query information from each one the plurality of database systems of the multi-system database management system;
combining the query information into a workload;
generating, from the workload, one or more candidate indexes for each one of the plurality of the database systems; and
selecting one or more recommended indexes from the candidate indexes for each one of the plurality of database systems at least partly based on the number of database nodes and the number of access modules in each database node, the number of parsing engines, and the version of database software of the configuration of each one of the plurality of database systems.

16. The method of claim 15, wherein combining the query information comprises combining workloads defined in the database systems into the workload used for generating the one or more recommended indexes.

17. The method of claim 16, wherein combining workloads defined in the database systems comprises combining the workloads identified by a particular workload identifier.

18. The method of claim 15, further comprising:
retrieving target emulation data from the plurality of database systems; and
emulating, in the computer, an environment of the plurality of database systems of the multi-system database management system,
wherein generating the one or more recommended indexes is performed in the emulated environment.

19. The method of claim 18, wherein the emulating is further based on information contained in a global dictionary that contains information from data dictionaries maintained in the corresponding database systems.

20. The method of claim 15, wherein generating the one or more recommended indexes is based on cost analysis performed by one or more optimizers in the emulated environment.

21. An article comprising at least one computer-readable storage medium storing at least instructions that when executed cause a computer to:
retrieve query information from each one of a plurality of database systems of a multi-system database management system, wherein each of the different configurations specifies: a number of database nodes and a number of access modules in each database node, a number of parsing engines, and a version of database software, and wherein the plurality of database systems have different configurations from each other, and wherein each of the database systems can process data independently by using one or more processors;
combine the query information into a workload;

generating, from the workload, one or more candidate indexes for each one of the plurality of the database systems; and select one or more recommended indexes from the candidate indexes for each one of the plurality of database systems at least partly based on the number of database nodes and the number of access modules in each database node, the number of parsing engines, and the version of database software of the configuration of each one of the plurality of database systems.

22. The article of claim 21, wherein generating the one or more recommended indexes comprises removing an index or adding an index.

23. The article of claim 21, wherein computations associated with generating the one or more recommended indexes are performed by multiple parsing engines and threads of an index selection tool in a virtual regulator environment.

* * * * *